United States Patent
Sanders et al.

(10) Patent No.: US 11,226,942 B2
(45) Date of Patent: Jan. 18, 2022

(54) CONTROLLING DEDUPLICATION IN A STORAGE POOL

(71) Applicant: International Business Machines Corporation, Armonk, NY (US)

(72) Inventors: Lee Jason Sanders, Chichester (GB); Ben Sasson, North Baddesley (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 16/654,223

(22) Filed: Oct. 16, 2019

(65) Prior Publication Data
US 2021/0117392 A1    Apr. 22, 2021

(51) Int. Cl.
*G06F 16/215*    (2019.01)

(52) U.S. Cl.
CPC .................. *G06F 16/215* (2019.01)

(58) Field of Classification Search
USPC ........................................................ 707/692
See application file for complete search history.

(56) References Cited

U.S. PATENT DOCUMENTS

| 7,567,188 B1 | 7/2009 | Anglin | |
|---|---|---|---|
| 8,539,148 B1 * | 9/2013 | Chen | G06F 3/061 711/112 |
| 8,712,976 B1 * | 4/2014 | Chen | G06F 16/1748 707/692 |
| 9,389,965 B1 * | 7/2016 | Douglis | G06F 11/1453 |
| 9,449,011 B1 | 9/2016 | Chen | |
| 9,460,102 B1 * | 10/2016 | Bono | G06F 3/0641 |
| 9,684,469 B1 * | 6/2017 | Douglis | G06F 12/121 |
| 9,891,860 B1 * | 2/2018 | Delgado | G06F 3/0689 |
| 2010/0082558 A1 | 4/2010 | Anglin | |
| 2013/0282673 A1 * | 10/2013 | Fiske | G06F 3/0659 707/692 |
| 2013/0283058 A1 * | 10/2013 | Fiske | G06F 16/1748 713/189 |
| 2014/0359244 A1 * | 12/2014 | Chambliss | G06F 3/0604 711/170 |
| 2017/0329815 A1 | 11/2017 | Fiske | |

OTHER PUBLICATIONS

"Apache Kafka," Apache Kafka webpage, accessed Oct. 8, 2019, 1 page. <https://kafka.apache.org/>.
Mell et al., "The NIST Definition of Cloud Computing," Recommendations of the National Institute of Standards and Technology, U.S. Department of Commerce, Special Publication 800-145, Sep. 2011, 7 pages.

* cited by examiner

*Primary Examiner* — Cam Linh T Nguyen
(74) *Attorney, Agent, or Firm* — Grant M. McNeilly

(57) ABSTRACT

A method and a system are provided for controlling deduplication in a storage pool. The method includes creating one or more deduplication domains within a storage pool, wherein storage volumes that are within a deduplication domain are deduplicated only with other volumes within the same deduplication domain and assigning storage volumes to a deduplication domain in order to control deduplication between storage volumes. The method may include, within a deduplication domain, blocklisting a volume from deduplication with a specified volume whilst allowing deduplication with other volumes in the deduplication domain.

17 Claims, 8 Drawing Sheets

CONTROLLING DEDUPLICATION IN A STORAGE POOL

BACKGROUND

The present invention relates to storage systems, and more specifically, to controlling deduplication in a storage pool.

Storage virtualization provides a method where a number of backend storage systems are connected via a Storage Area Network (SAN) to a storage controller/director or some other storage appliance. The backend storage systems may be local to the appliance running the software or maybe connected externally. The backend storage system normally consists of a number of physical drives that are either spinning disk or more commonly Flash based storage which are configured in a RAID format An application communicates with the storage controller for access to the backend storage system. As far as the application is concerned it is not aware of the class of storage that it is communicating with. The benefit to the user is that storage system can manage the storage itself. Fault tolerance is built-in to the system at all levels so that any failure anywhere in the system, the application can continue running seamlessly.

A feature of storage virtualization appliances is data deduplication. There is ever increasing demand to store more user data with the same physical capacity because doing so would reduce the overall cost of ownership of the storage system. Data deduplication works by identifying repeated data patterns and instead of storing the user data, it will create a reference to the duplicate data that is stored elsewhere in the system. It may be that the existing duplicate is within the same volume, another volume (either in the same pool or another pool within the storage system), or a volume used by another host. Use cases for data duplication are such as, a virtual machine boot operating system image that is used by multiple hosts, in this case the host operating system may well be the same version and therefore it would be a waste to store multiple copies of that data.

The user may often want to be able to create independent copies of these volumes, for testing purposes or because they would like to back up their data. Frequently, particularly on storage controllers, all of the physical storage is placed into a single pool, this creates an issue for deduplication where users need to be able to have independent copies of volumes for backup or testing purposes, as the system will deduplicate the copy of the data to the original source volume, defeating the purpose of having a fully independent copy of the data.

SUMMARY

According to an aspect of the present disclosure there is provided a computer-implemented method for controlling deduplication in a storage pool, comprising: creating one or more deduplication domains within a storage pool, wherein storage volumes that are within a deduplication domain are deduplicated only with other volumes within the same deduplication domain; and assigning storage volumes to a deduplication domain in order to control deduplication between storage volumes.

According to another aspect of the present disclosure there is provided a system for controlling deduplication in a storage pool, comprising: a processor and a memory configured to provide computer program instructions to the processor to execute functions of the following components: a deduplication domain creating component for creating one or more deduplication domains within a storage pool, wherein storage volumes that are within a deduplication domain are deduplicated only with other volumes within the same deduplication domain; and a deduplication domain component for assigning storage volumes to a deduplication domain in order to control deduplication between storage volumes.

According to a further aspect of the present disclosure there is provided a computer program product for controlling deduplication in a storage pool, the computer program product comprising a computer readable storage medium having program instructions embodied therewith, the program instructions executable by a processor to cause the processor to: create one or more deduplication domains within a storage pool, wherein storage volumes that are within a deduplication domain are deduplicated only with other volumes within the same deduplication domain; and assign storage volumes to a deduplication domain in order to control deduplication between storage volumes.

The computer readable storage medium can be a non-transitory computer readable storage medium and for the computer readable program code can be executable by a processing circuit.

BRIEF DESCRIPTION OF THE DRAWINGS

The subject matter regarded as the invention is particularly pointed out and distinctly claimed in the concluding portion of the specification. The disclosure, both as to organization and method of operation, together with objects, features, and advantages thereof, may best be understood by reference to the following detailed description when read with the accompanying drawings.

Embodiments of the present disclosure will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The concept proposed by the described method and system is that a user can create one or more deduplication domains within a storage pool with allocated storage. The user can designate volumes to be a member of a specific deduplication domain. Within a deduplication domain, deduplication references are allowed to be created between volumes within the deduplication domain; however, references are not allowed outside of the deduplication domain.

Additional functionality of the described method and system adds more granular control to a deduplication domain by blocklisting a volume in a deduplication domain from being deduplicated from a specified volume in the deduplication domain as the blocklisted volume is needed for copy services of the specified volume. This may be carried out in an automated fashion by detecting volumes needed for copy services to an identified volume and blocklisting the detected volume for deduplication to the identified volume.

Figure 1:
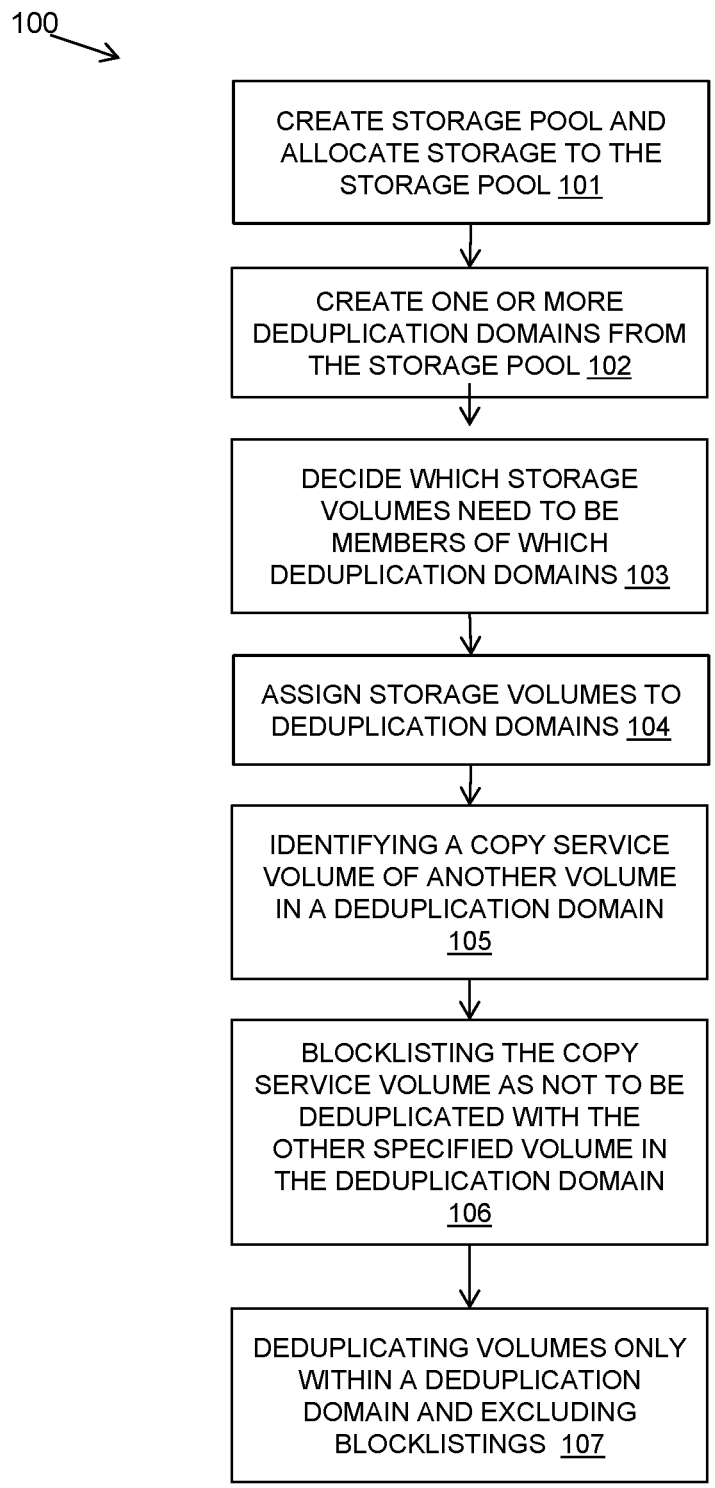
FIG. 1 is a flow diagram of an example embodiment of a method in accordance with the present disclosure.

Referring to FIG. 1, a flow diagram 100 shows an example embodiment of the described system as carried out at a storage controller or other storage appliance in which deduplication of storage volumes is carried out in a storage pool.

In the example embodiment, a storage controller provides a view of storage as managed disks that are provisioned by a backend physical storage. A storage pool is formed of managed disks that contribute extents to the storage pool from which segments in the form of volumes are provisioned.

Volumes are logical disks that are presented to the host or application servers by the storage controller. Hosts or application servers can see only the logical volumes that are created from combining extents from the storage pool.

In the described method, a storage pool is created 101 as normal by a user in the form of an administrator of the system with storage allocated to the storage pool. One or more deduplicating domains are created 102 from the storage pool according to requirements of the user. This may be implemented by in the same way as an administrator creates the storage pool and the logical volumes from the storage pool, for example, using the graphical user interface (GUI) or command line that manages the system.

Each deduplication domain is created so that volumes within a deduplication domain may be deduplicating with other volumes in the same deduplication domain, but may not deduplicate externally to the domain, for example, with volumes in other deduplication domains.

A decision process may be carried out to decide 103 which volumes need to be members of which deduplication domain within the storage pool, or if the volume is to be outside any deduplication domain. A volume may be assigned outside any deduplication domain if it is not deduplication enabled or if deduplication is allowed outside the storage pool.

One example of when two different deduplication domains are required is in a multi-tenancy environment in a datacenter, where space is "rented" out to various tenants in the datacenter and where one client's data cannot be visible from another client. In this case, separating out deduplication domains will minimize risk of data leakage.

The method may assign 104 the storage volumes to a deduplication domain based on the decision in order to control deduplication between the storage volumes. Within a deduplication domain, deduplication references are allowed to be created between volumes within the deduplication domain, but references are not allowed to be created with volumes outside of the deduplication domain.

Within a deduplication domain, a volume may be identified 105 as a copy service volume of another specified volume in the same deduplication domain. The method may blocklist 106 the copy service volume from deduplication from the specified volume whilst allowing deduplication with other volumes in the deduplication domain.

The method may automatically identify 105 and blocklist 106 volumes by recognizing volumes that are a copy for redundancy purposes of another volume in the deduplication domain. This may be implemented when replication is carried out at the storage layer. A copy service volume may be identified when the user has triggered a copy of a source volume that is in the same deduplication domain; the system recognizes it is a copy of a source volume and blocklists it from deduplicating with the source volume.

A volume may also be identified 105 and blocklisted 106 via a manual user configuration by the storage administrator. This may be due to a host application doing the replication as the application requires independent copies.

Where the host application is carrying out the replication, the host application may send commands using a logical device interface for the non-volatile storage media (for example, Small Computer System Interface (SCSI) commands, or Non-Volatile Memory Express (NVMe) commands). The commands may be implemented automatically at the storage layer resulting in the blocklisting 106 of volumes identified in the commands.

The method may deduplicate 107 volumes only within a deduplication domain and excluding any blocklistings of volumes. Deduplication references are allowed to be created between volumes within a deduplication domain and references are not allowed to be created with volumes outside of the deduplication domain. In addition, deduplication references are not allowed to be created to and from volumes specified as blocklisted.

Where the host application is carrying out the replication the host may express a desire to not deduplicate the data. If the volumes assigned to the host application are assigned to the same storage pool, then the storage system may choose to deduplicate the mirrored copy, therefore instead of having a mirrored volume only a single copy of the data would be stored thereby defeating the point of having a mirrored volume. The host application may therefore indicate to the storage system that it should not deduplicate the mirrored data if the replicated volumes are allocated to the same deduplication domain.

The host operating system may issue a directive, such as a SCSI or NVMe command flag, to indicate that the write of a volume should not be deduplicated with its source volume in the event that they are allocated to the same deduplication domain and therefore the storage system will respond to that directive by allocating specific space instead of performing a deduplicating lookup and creating a reference with the source volume.

A host application that carries out replication may receive from the storage system, via SCSI or NVMe interfaces, the deduplication characteristics of the underlying storage technology. The host application then knowing the underlying storage technology may take preventative measures to avoid the storage system from deduplicating the replicated data.

This may be carried out by: changing the data slightly so it is not deduplicated; writing the data to another deduplication domain; or writing the data to the same deduplication domain whilst setting a flag in the SCSI/NVMe write commands to instruct the storage system not to deduplicate the data with the source data.

Figure 2:
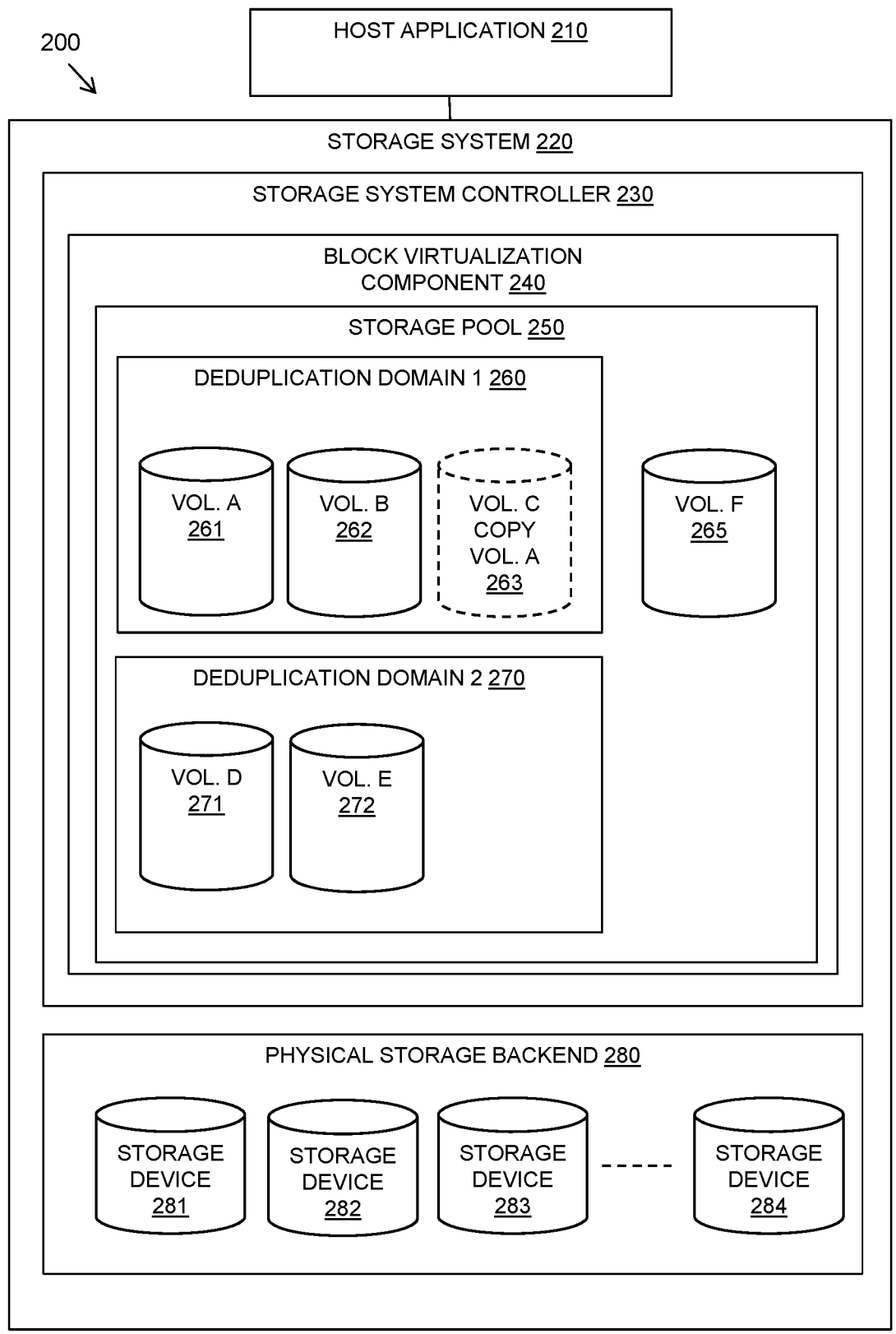
FIG. 2 is a block diagram of a storage system in which the described method may be implemented in accordance with the present disclosure.

Referring to FIG. 2, a block diagram 200 shows an example embodiment of a storage system 220 in which the described method and system may be implemented.

The storage system 220 provides storage for host applications 210 at one more host servers having storage interfaces through which I/O operations are handled for writing and reading data to and from the storage system 220.

The storage system 220 includes one or more storage system controllers 230 and a physical storage backend 280. The physical storage backend 280 provides physical disk storage across an array of physical devices 281-284 of non-volatile storage media. The physical storage backend 280 has physical addresses at which logical units of host data are stored and referenced by logical block addresses (LBAs) in a block virtualization component 240 of a storage system controller 230.

A storage system controller 230 may maintain a virtual domain in which logical metadata of LBAs is mapped to references of physical addresses at which the host data is stored at a physical storage backend 280. A storage pool 250 may be allocated at the storage system controller 230 for a host application 210. In accordance with the described system, within the storage pool 250 one or more deduplication domains 260, 270 may be defined in which deduplication volumes 261-263, 271-272 may be allocated. Non-deduplication volumes 265 or volumes that may deduplicate outside the storage pool 250 may be allocated outside the deduplication domains 260, 270.

In the illustrated example, a first deduplication domain 260 is provided in which Volume A 261, Volume B 262, and Volume C 263 are allocated. Volume C may be a copy of Volume A 261 for redundancy purposes and therefore may be blocklisted as not being allowed to be deduplicated with Volume A 261. Due to the blocklisting Volume A 261 cannot deduplicate from Volume C 263 and vice versa.

Volume A 261 and Volume B 262 can deduplicate and Volume B 262 and Volume C 263 can deduplication. However, if Volume A 261 deduplicates from Volume B 262, Volume C 263 must still be a copy of Volume A 261 without Volume B 262 becoming an indirect dependent on Volume A 261.

A second deduplication domain 270 is provided in which Volume D 271 and Volume E 272 are allocated. Volume F 265 may be provided outside the deduplication domains 260, 270.

In some environments, deduplication can operate across multiple storage controllers or storage pools. Therefore, the physical storage will also be separated across those multiple pools and controllers and, consequently, there is failure domain issue. If a volume is reliant on multiple physical storage controllers, this adds an extra element of risk to the system.

Volume F 265 is an example of the user explicitly requesting that the volume is not deduplicating at all and will want it on its own storage. In this example, the user is prioritizing redundancy over space optimization.

By using a deduplication domain, the user places space optimization as a high priority, but also considers for a specific copy of a volume, such as Volume C 263 as a copy of Volume A 261, redundancy as a higher priority than space optimization.

Figure 3A:
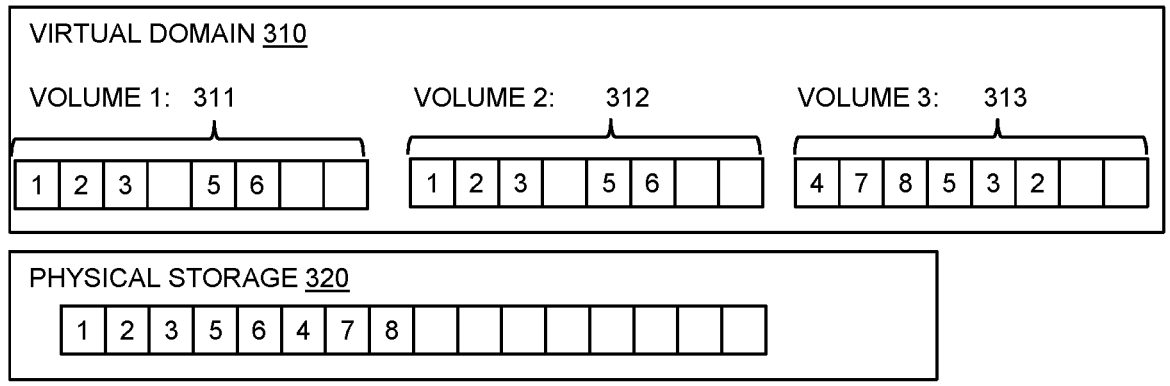
FIG. 3A is a schematic diagram of a prior art method of storage.
Figure 3B:
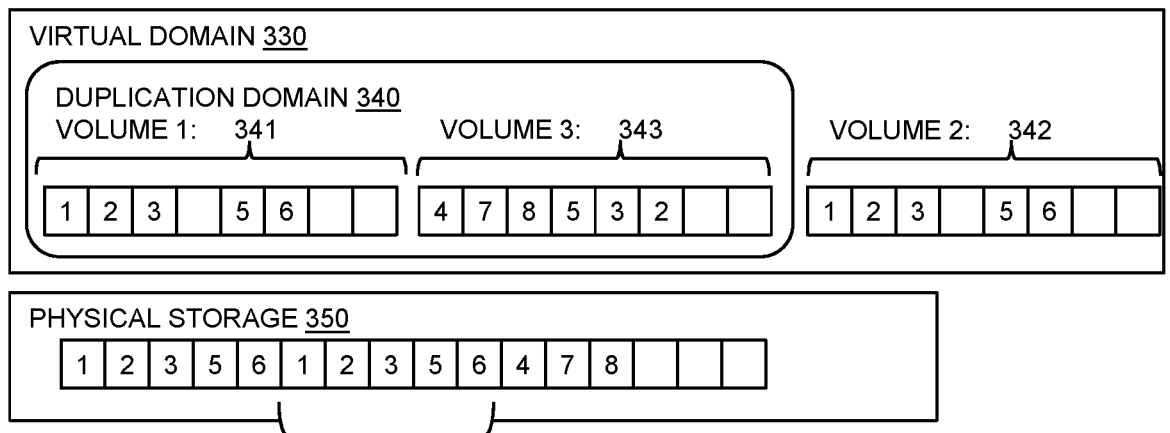
FIG. 3B is a schematic diagram of an example of a first aspect of a method in accordance with the present disclosure.
Figure 3C:
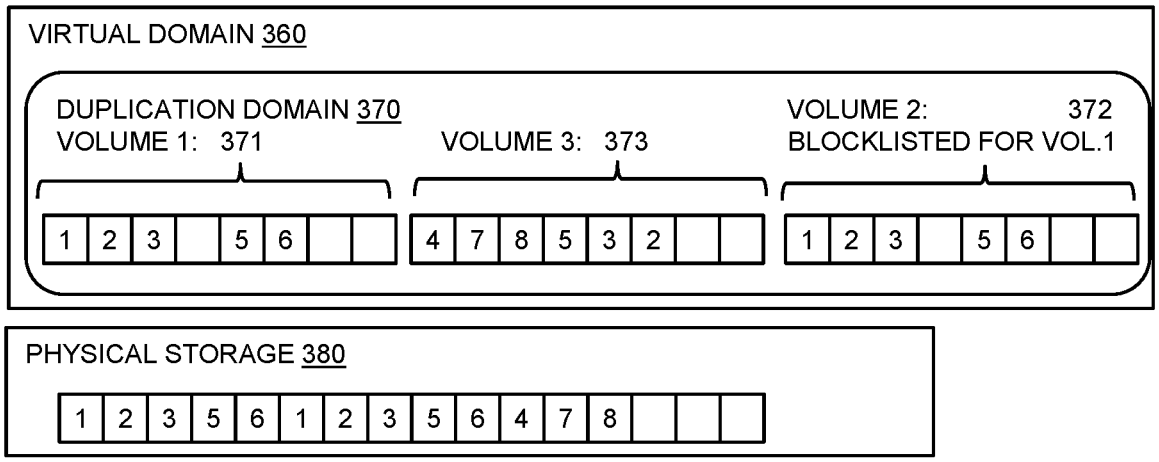
FIG. 3C is a schematic diagram of an example of a second aspect of a method in accordance with the present disclosure.

Referring to FIGS. 3A, 3B and 3C, schematic diagrams show three scenarios of three volumes in a virtual domain 310, 330, 360 with storage allocated and stored in physical storage 320, 350, 380. In each of the scenarios, Volume 1 311, 341, 371 and Volume 2 312, 342, 372 are identical in content with blocks 1 2 3 5 6. Volume 3 313, 343, 373 has blocks 4 7 8 5 3 2 and therefore shares some commonality with Volumes 1 and 2 (blocks 5 3 2), but it also has a number of unique blocks (blocks 7 8).

Figure 3D:
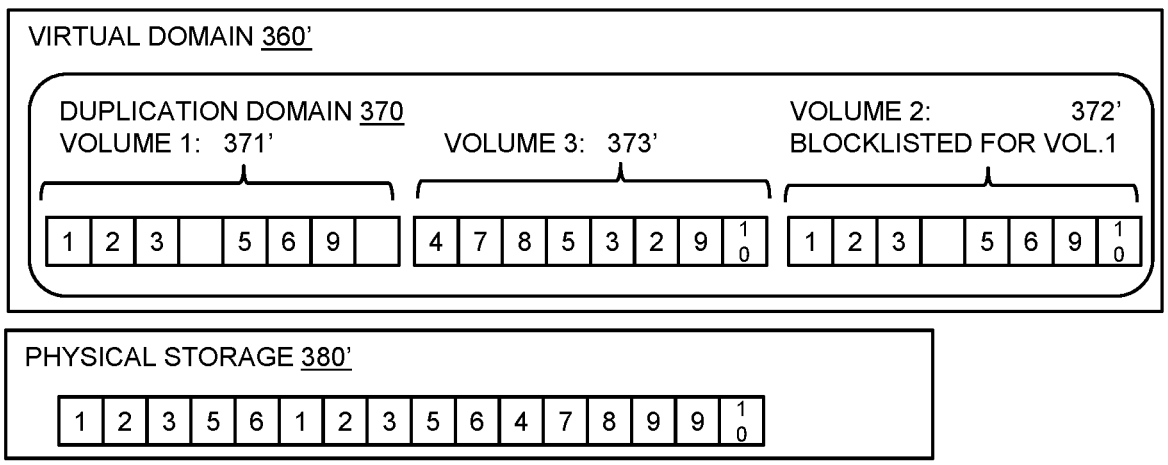
FIG. 3D is a schematic diagram of a development of the second aspect of a method in accordance with the present disclosure.

In FIG. 3A, the scenario is a prior art method in which deduplication is carried out across the volumes. In FIG. 3B, a first aspect of the described method is illustrated with a deduplication domain 340. In FIGS. 3C and 3D, a second aspect of the described method is illustrated with a deduplication domain 370 and blocklisting.

In FIG. 3A, Volume 1 311 and Volume 2 312 share the same physical storage 320 location for blocks 1 2 3 5 and 6. Volume 3 313 also shares blocks 5 3 and 2 with Volume 1 311 and Volume 2 312, resulting in just the additional blocks 4 7 8 being stored.

In FIG. 3B, the user has configured a deduplication domain 340 between Volume 1 341 and Volume 3 343 in the virtual domain 330. The user has decided that they would like Volume 2 342 to be independent of the deduplicating. This is either because the user has configured the system this way or the host operating system wants a fully independent copy of its metadata as stored on Volume 2 342.

After storing the data, Volume 1 341 and Volume 3 343 have stored data "1 2 3 5 6" and "4 7 8" at the physical storage 350 and as Volume 2 342 has independently stored data "1 2 3 5 6" 351 at the physical storage 350. In FIG. 3B, the user does not want Volume 2 342 to deduplicate from Volume 1 341 or Volume 3 343 and is willing to increase capacity usage compared to the scenario of FIG. 3A.

The ordering of the blocks at the physical storage 350 is dependent on the order the blocks were written to the three volumes and is not guaranteed. The diagram is to explain how the system works as an example.

In FIG. 3C, the user has configured a deduplication domain 370 between Volume 1 371, Volume 2 372, and Volume 3 373 in the virtual domain 360. Volume 2 372 is a mirror of Volume 1 371 for backup purposes. This is detected and Volume 2 372 is blocklisted from deduplication with Volume 1 371. Volume 2 372 in the form of a copy of source Volume 1 371 is in the same deduplication domain 370 as the source Volume 1 371 but it is expressly prohibited from deduplicating from Volume 1 371.

The aspect shown in FIG. 3C allows the user to create more granular deduplication domains within a single pool, but also allows the system to automatically select volumes to be blocklisted from creating deduplication to other volumes which are a copy for redundancy purposes. The clear benefit is deduplication is still allowed thus creating an opportunity for space efficiency whilst still allowing copies of the same data that are meant to be for redundancy, and to not deduplicate unintentionally and hinder what the user wants to do.

If Volume 2 342 in FIG. 3B is also a copy of a Volume 1 341, the difference between the scenarios of FIGS. 3B and 3C depends on the user's choice of what they intend to do with the independent copies of Volumes 1 341, 371 after they are made. Some users may want to test with the volume with another instance of the application, other users may just want an independent backup. If the user wants to write to the independent copy (i.e., test it), then they may still want the benefits of space utilization.

Referring to FIG. 3D, after the copy Volume 2 372 has been made (for example, in FIG. 3C), the user wants to write data "9" to each of Volume 1 371, Volume 2 372 and Volume 3 373 and write data "10" to Volume 2 372 and Volume 3 373, thus creating Volume 1 371', Volume 2 372', and Volume 3 373'. In FIG. 3D, it is shown that "9" is written twice in the physical storage 380' because Volume 1 371' and Volume 2 372' cannot deduplicate, but "10" is written once because it can deduplicate with Volume 3 373'. This demonstrates that Volume 2 372' and Volume 3 373' are deduplicating from each other, hence "10" is only added once for Volume 2 372' and Volume 3 373'.

An example use case of this would be that at a first step the user takes an independent copy of a volume, then at a second step the user wishes to test their independent copy by writing to it (in which case it will no longer be an independent copy). The described method is applicable to the copy process at the first step to ensure the copy process generates a real independent copy.

In a conventional system, a pool does not have the capability for the system to disallow deduplicating between volumes within the pool. This causes a problem when the user tries to create mirrored or copies for backup purposes. In a conventional system, user needs to deploy additional storage to mirror/back up the data onto, which means the user has to appreciate extra cost, power, and management demands and take extra mitigating steps of:

Configuring extra storage, such as extra RAID arrays;
Setting up replication from the source volume to the target; and
Setting up a failover mechanism and action plan to continue operation in the event that one copy of the data fails, for example, due to corruption.

With the described method and system, the user need not deploy additional storage which will decrease cost and power.

Figure 4:
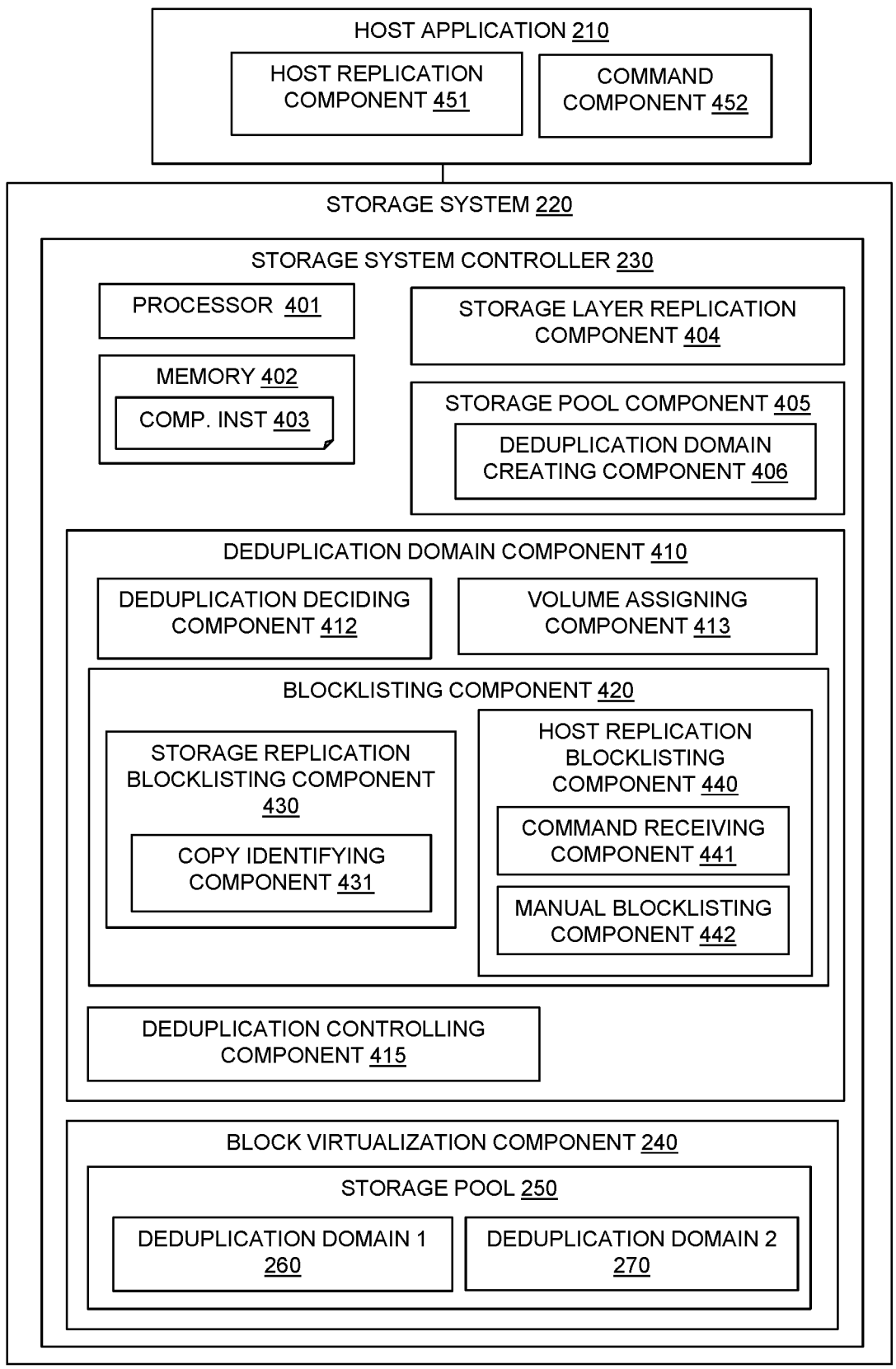
FIG. 4 is block diagram of an example embodiment of a system in accordance with the present disclosure.

Referring to FIG. 4, a block diagram shows an example embodiment of a storage system 220 with a storage system controller 230 including at least one processor 401, a hardware module, or a circuit for executing the functions of the described components which may be software units executing on the at least one processor 401. Multiple processors 401 (not shown) running parallel processing threads may be provided enabling parallel processing of some or all of the functions of the components. Memory 402 may be configured to provide computer instructions 403 to the at least one processor 401 to carry out the functionality of the components.

The storage system controller 230 may include a storage pool component 405 that provides functionality for a user in the form of an administrator to allocate storage to a storage pool 250. The storage pool component 405 may include a deduplicating domain creating component 406 for creating one or more deduplicating domains 260, 270 within a storage pool 250 according to the requirements of the user. Storage volumes that are within a deduplication domain 260, 270 are deduplicated only with other volumes within the same deduplication domain 260, 270 taking into account any deduplication blocklisting between volumes in a domain.

The storage system controller 230 may include a deduplication domain component 410 for assigning volumes to the deduplication domains 260, 270 within a storage pool 250.

The deduplication domain component 410 may include a blocklisting component 420 for blocklisting a volume from deduplication from a specified volume within a deduplication domain 260, 270, whilst allowing deduplication with other volumes in the deduplication domain.

The deduplication domain component 410 includes a volume assigning component 413 for assigning storage volumes to a deduplication domain 260, 270 in order to control deduplication between storage volumes.

The deduplication domain component 410 may include a blacklisting component 420 for blacklisting a volume from deduplication from a specified volume within a deduplication domain 260, 270, whilst allowing deduplication with other volumes in the deduplication domain.

In some situations, copy services for redundancy are provided at a storage layer and a storage layer replication component 404 may be provided at the storage system controller 230. In this scenario, the blocklisting component 420 may include a storage replication blocklisting component 430 for automatically selecting volumes for blocklisting by using a copy identifying component 431 to identify copy volumes allocated to a duplication domain 260. An identified copy volume is blocklisted by the blocklisting component 420 with respect to its source volume and the volumes are prevented from deduplication.

In other situations, copy services for redundancy are provided at a host application 210 by a host replication component 451. In this scenario, the blocklisting component 420 may include a host replication blocklisting component 440. The host replication blocklisting component 440 may include a manual blocklisting component 442 for manually selecting volumes for blacklisting by an administrator at the storage system 220. The host replication blocklisting component 440 may include a command receiving component 441 to receive commands issued by a command component 452 at the host application 210 to identify copy volumes allocated to a duplication domain 260. An identified copy volume is blocklisted by the blocklisting component 420 with respect to its source volume and the volumes are prevented from deduplication.

The deduplication domain component 410 may include a deduplication controlling component 415 for allowing deduplication references to be created between volumes within a deduplication domain 260, 270 and blocking references from being created with volumes outside of the deduplication domain 260, 270. Deduplication references are not allowed to be created to and from volumes specified as blocklisted within a deduplication domain 260, 270.

Figure 5:
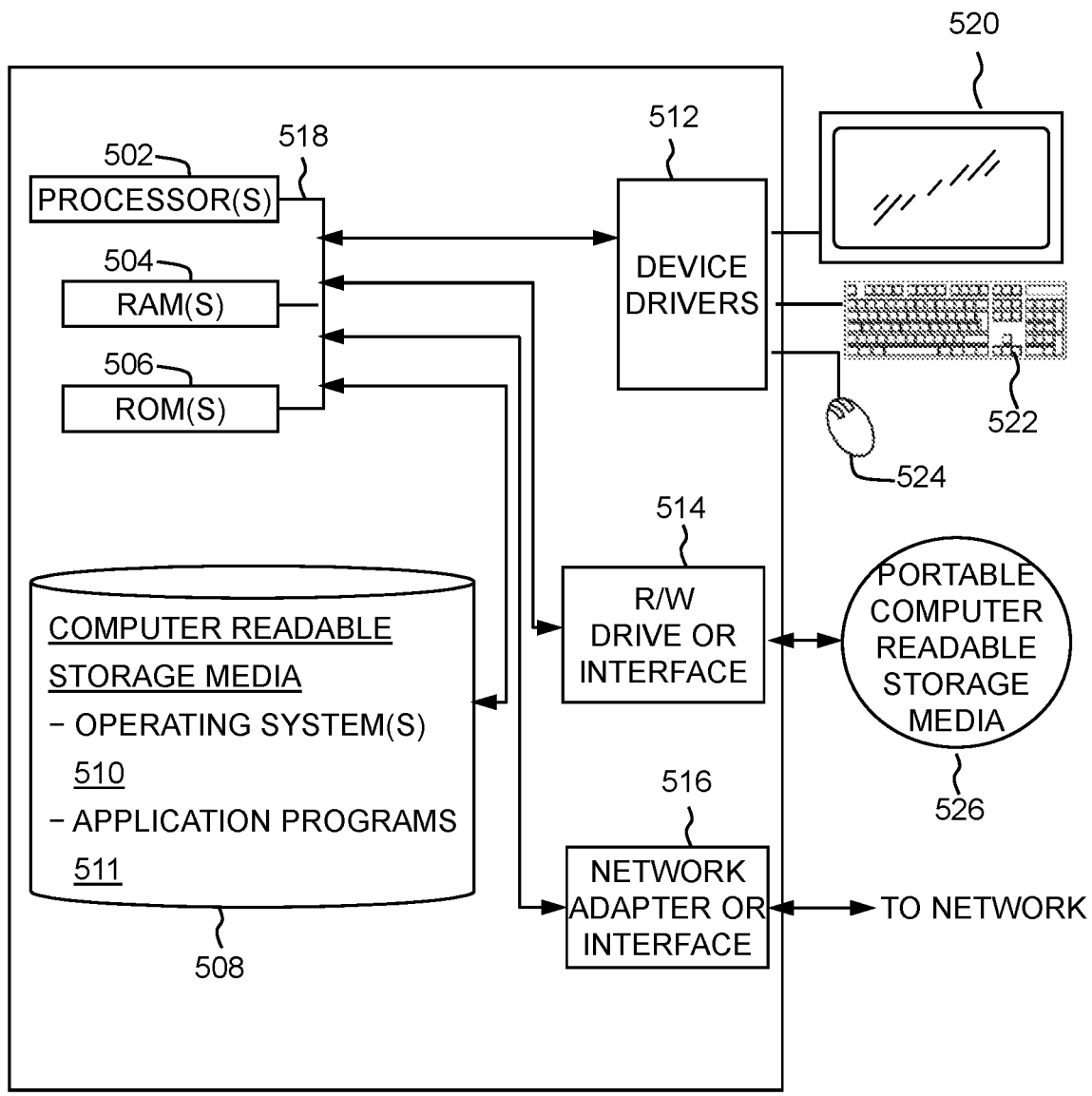
FIG. 5 is a block diagram of an embodiment of a computer system or cloud server in which the present disclosure may be implemented.

FIG. 5 depicts a block diagram of components of the computing device of the storage system 220 of FIG. 4, in accordance with an embodiment of the present disclosure. It should be appreciated that FIG. 5 provides only an illustration of one implementation and does not imply any limitations with regard to the environments in which different embodiments may be implemented. Many modifications to the depicted environment may be made.

Computing device can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the duplication domain component 410 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

Computing device can also include a R/W drive or interface 514 to read from and write to one or more portable computer readable storage media 526. Application programs 511 on computing device can be stored on one or more of the portable computer readable storage media 526, read via the respective R/W drive or interface 514 and loaded into the respective computer readable storage media 508.

Computing device can also include a network adapter or interface 516, such as a TCP/IP adapter card or wireless communication adapter. Application programs 511 on computing device can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing device can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
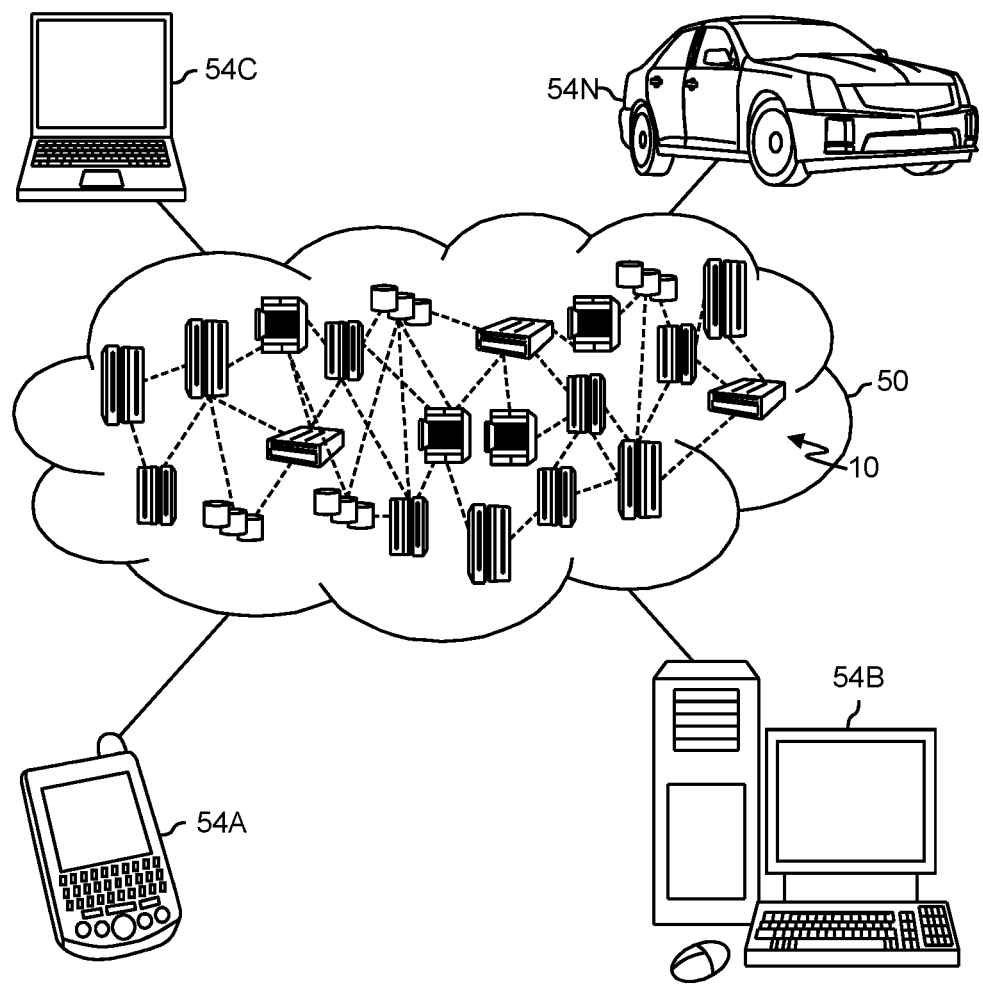
FIG. 6 is a schematic diagram of a cloud computing environment in which the present disclosure may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
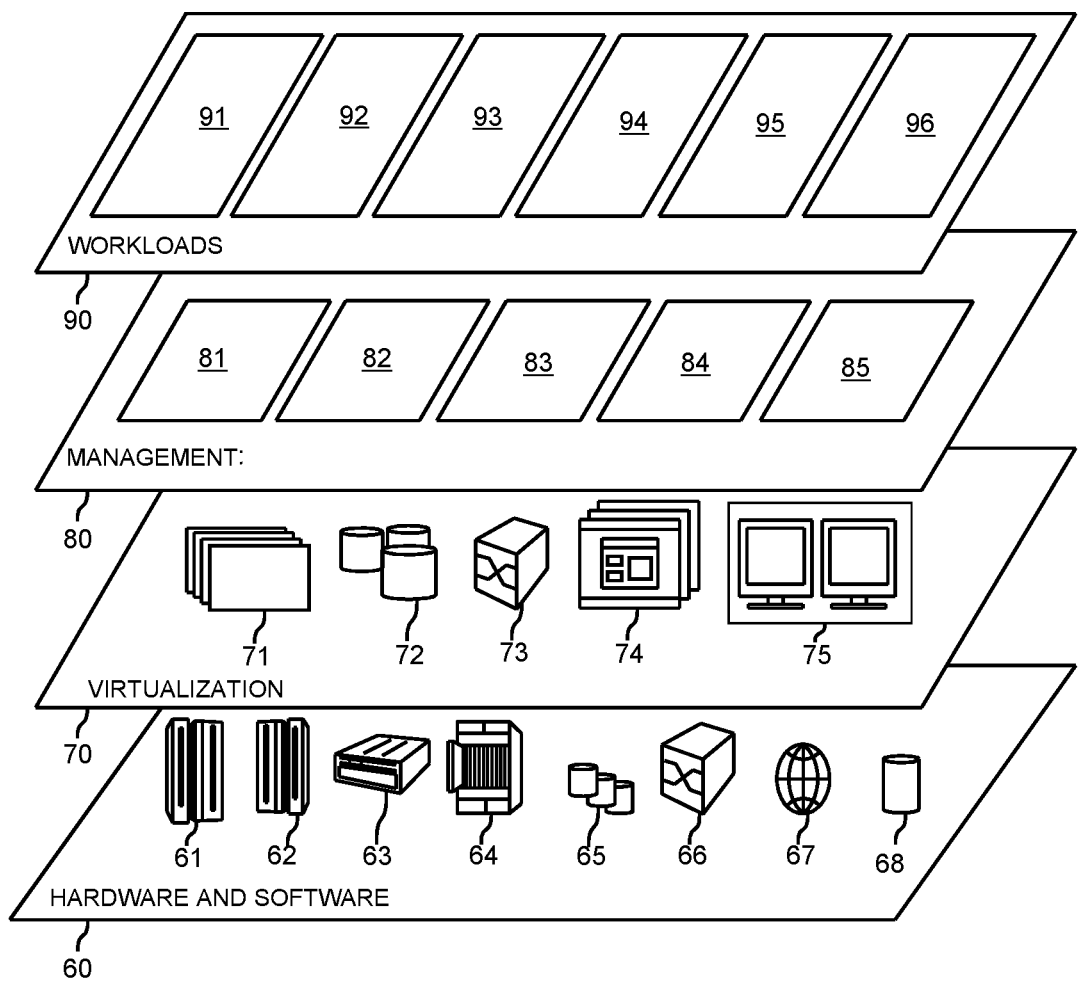
FIG. 7 is a diagram of abstraction model layers of a cloud computing environment in which the present disclosure may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage controller processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for controlling deduplication in a storage pool, comprising:
   receiving a command from an administrator regarding storage allocation requirements in a computing storage pool;
   creating one or more deduplication domains within the storage pool according to the command, wherein storage volumes that are within a deduplication domain are deduplicated only with other storage volumes within the same deduplication domain;
   assigning some storage volumes that are not deduplication enabled to a non-deduplication domain;
   assigning other storage volumes to a deduplication domain in order to control deduplication between the other storage volumes; and
   within the deduplication domain, blocklisting a storage volume from deduplication with a specified volume whilst allowing deduplication with other volumes in the deduplication domain.

2. The method as claimed in claim 1, including:
   automatically blocklisting the storage volume by recognizing the storage volume is a copy for redundancy purposes of another identified volume in the deduplication domain.

3. The method as claimed in claim 1, including:
   automatically blocklisting the storage volume according to the command received from a host application that the storage volume is a copy for redundancy purposes of another specified volume in the deduplication domain.

4. The method as claimed in claim 1, including:
manually blocklisting the storage volume for deduplication with a specified volume within a deduplication domain.

5. The method as claimed in claim 1, wherein within the deduplication domain, deduplication references are not allowed to be created between a blocklisted volume and the specified volume.

6. The method as claimed in claim 1, including:
creating the storage pool and allocating storage to the storage pool; and
creating the one or more deduplicating domains from the storage pool.

7. The method as claimed in claim 6, including:
deciding which storage volumes are to be members of the deduplication domain within the storage pool; and
assigning the storage volumes to the deduplication domain.

8. The method as claimed in claim 1, wherein within the deduplication domain, deduplication references are created between storage volumes within the deduplication domain and references are not allowed to be created with storage volumes outside of the deduplication domain.

9. A system for controlling deduplication in a storage pool, comprising:
a processor and a memory configured to provide computer program instructions to the processor to execute functions of the following components:
a command receiving component configured to receive a command from an administrator regarding storage allocation requirements in a computing storage pool;
a deduplication domain creating component configured to create one or more deduplication domains within the storage pool according to the command, wherein storage volumes that are within a deduplication domain are deduplicated only with other storage volumes within the same deduplication domain;
a deduplication domain component configured to:
assign some storage volumes that are not deduplication enabled to a non-deduplication domain; and
assign other storage volumes to a deduplication domain in order to control deduplication between the other storage volumes; and
a blocklisting component configured to blocklist a storage volume from deduplication with a specified volume within the deduplication domain, whilst allowing deduplication with other volumes in the deduplication domain.

10. The system as claimed in claim 9, including:
a copy identifying component configured to automatically select storage volumes to be blocklisted by recognizing storage volumes that are a copy for redundancy purposes of another identified volume in the deduplication domain.

11. The system as claimed in claim 9, including:
a manual blocklisting component configured to manually blocklist a storage volume for deduplication with the specified volume within the deduplication domain.

12. The system as claimed in claim 9, wherein the command receiving component is further configured to automatically blocklist the storage volume according to the command received from a host application that the storage volume is a copy for redundancy purposes of a specified volume in the deduplication domain.

13. The system as claimed in claim 9, including a deduplication controlling component wherein, within a deduplication domain, deduplication references are not allowed to be created between a blocklisted volume and the specified volume.

14. The system as claimed in claim 9, including:
the deduplication domain creating component being provided in association with a storage pool component configured to create the storage pool and allocating storage to the storage pool.

15. The system as claimed in claim 9, including:
a deduplication deciding component for deciding which storage volumes are members of which deduplication domain within the storage pool.

16. The system as claimed in claim 9, including a deduplication controlling component wherein deduplication references are created between storage volumes within the deduplication domain and references are not allowed to be created with storage volumes outside of the deduplication domain.

17. A computer program product for controlling deduplication in a storage pool, the computer program product comprising a computer readable storage medium having program instructions embodied therewith, the program instructions executable by a processor to cause the processor to:
receive a command from an administrator regarding storage allocation requirements in a computing storage pool;
create one or more deduplication domains within the storage pool according to the command, wherein storage volumes that are within a deduplication domain are deduplicated only with other storage volumes within the same deduplication domain;
assign some storage volumes that are not deduplication enabled to a non-deduplication domain;
assign other storage volumes to a deduplication domain in order to control deduplication between the other storage volumes; and
within the deduplication domain, blocklist a storage volume from deduplication with a specified volume whilst allowing deduplication with other storage volumes in the deduplication domain.

* * * * *